(12) United States Patent
Parker et al.

(10) Patent No.: US 9,983,691 B2
(45) Date of Patent: May 29, 2018

(54) STYLEABLE CUSTOM BUTTON REPEAT

(71) Applicant: Home Box Office, Inc., New York, NY (US)

(72) Inventors: J. Jordan C. Parker, Seattle, WA (US); Brendan Joseph Clark, Seattle, WA (US); Nathan J. E. Furtwangler, Kirkland, WA (US)

(73) Assignee: HOME BOX OFFICE, INC., New York, NY (US)

( * ) Notice: Subject to any disclaimer, the term of this patent is extended or adjusted under 35 U.S.C. 154(b) by 66 days.

(21) Appl. No.: 14/843,830

(22) Filed: Sep. 2, 2015

(65) Prior Publication Data

US 2016/0070361 A1 Mar. 10, 2016

Related U.S. Application Data

(60) Provisional application No. 62/046,146, filed on Sep. 4, 2014.

(51) Int. Cl.
*G06F 3/023* (2006.01)
*G06F 3/0484* (2013.01)
(Continued)

(52) U.S. Cl.
CPC ............ *G06F 3/0238* (2013.01); *G06F 3/023* (2013.01); *G06F 3/0484* (2013.01); *G06F 3/04886* (2013.01); *G06F 3/04897* (2013.01)

(58) Field of Classification Search
CPC combination set(s) only.
See application file for complete search history.

(56) References Cited

U.S. PATENT DOCUMENTS

2003/0098885 A1 5/2003 Yabe
2005/0022138 A1* 1/2005 Tunney ................. G06F 3/0482
715/827

(Continued)

FOREIGN PATENT DOCUMENTS

EP 2592536 5/2013
EP 2592536 A1 * 5/2013 .......... H04M 1/7258

OTHER PUBLICATIONS

International Search Report and Written opinion from International Patent Application Serial No. PCT/US2015/048408, dated Nov. 4, 2015, 13 pages.

(Continued)

*Primary Examiner* — Jennifer Mehmood
*Assistant Examiner* — Deeprose Subedi
(74) *Attorney, Agent, or Firm* — Amin, Turocy & Watson, LLP

(57) ABSTRACT

The described technology is directed towards a button repeat system that allows different repeat behaviors (e.g., interval times between repeats) to be customized for any view (user interface element) and for any button. A designer specifies an interval set comprising interval times to use in an associated view to repeat a button that is pressed and held. Using global information across views, a button that is pressed and held may continue to repeat as focus changes among views. The repeating may continue without needing to reset to the first interval time of the interval set of each view as focus changes, so that, for example, a rapidly repeating button does not appear to change its repetition rate as focus changes among views.

20 Claims, 11 Drawing Sheets

(51) Int. Cl.
*G06F 3/0488* (2013.01)
*G06F 3/0489* (2013.01)

(56) References Cited

U.S. PATENT DOCUMENTS

2008/0295015 A1* 11/2008 Liu .................... G06F 3/04895
  715/772
2009/0070710 A1* 3/2009 Kagaya ............. G06F 17/30038
  715/810

OTHER PUBLICATIONS

Murphy, A S, "Decreasing Time Interval Method for Accelerating Keystroke Action," IBM Technical Disclosure Bulletin, Jul. 1, 1983, 4 pages.
Office Action for U.S. Appl. No. 15/856,730 dated Mar. 5, 2018, 45 pages.

* cited by examiner

STYLEABLE CUSTOM BUTTON REPEAT

CROSS-REFERENCE TO RELATED APPLICATION

The present application claims priority to U.S. provisional patent application Ser. No. 62/046,146, filed Sep. 4, 2014, the entirety of which is incorporated herein by reference.

BACKGROUND

In a computer application, a user can usually hold down a button causing the button press action to effectively repeat until the user releases it. For example, holding down an arrow (cursor) keyboard key in a word processor application continues to move the cursor within the document (until an ending point is reached) without the user having to continually actuate and release that arrow button. A spreadsheet provides the same repeat behavior whether moving among cells or moving the cursor within the text of a cell.

Continuing with the above application examples, when the user holds down the arrow key, the cursor jumps once immediately, delays a little while, and then starts continuously repeating. The small delay results from the application ignoring the repeating key command events for a little while to give the user time to release the button and thereby avoid starting the continuous repeat unless desired.

Another typical repeat feature is that the most recent button selected is the only one that can repeat. For example, if a user holds down the right arrow keyboard key and then holds down the left arrow keyboard key (without releasing the right arrow key), the cursor movement to the right stops and instead starts going left. Thereafter, If the user releases the left arrow key (still without having released the right arrow key), the cursor movement stops and does not start going right again.

The above button repeating operations are typical standard behavior in many applications. While this works reasonably well in applications that in general have a main user interface (e.g., for typing in text or moving among spreadsheet cells) plus a few drop-down menus, it is relatively limiting to have the same behavior apply everywhere in an application. Indeed, a more complex user interface may have many menus, some with a few selections and others with hundreds or even thousands of selections available per menu. It is not flexible for a developer to have to use the same repeat pattern throughout a user interface.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, the technology described herein is directed towards button repeat data (e.g., including one or more repeat intervals) that may be specified per-view and per-button. To this end, one or more aspects are directed towards obtaining button event data at a view, in which the button event data corresponds to a last button still pressed, and using the button repeat data including a repeat interval set associated with the button and the view to determine (at least) a first repeat interval for the button and a second repeat interval for the button. The button is repeated at the view based upon the first repeat interval, and the button is repeated at the view based upon the second repeat interval.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
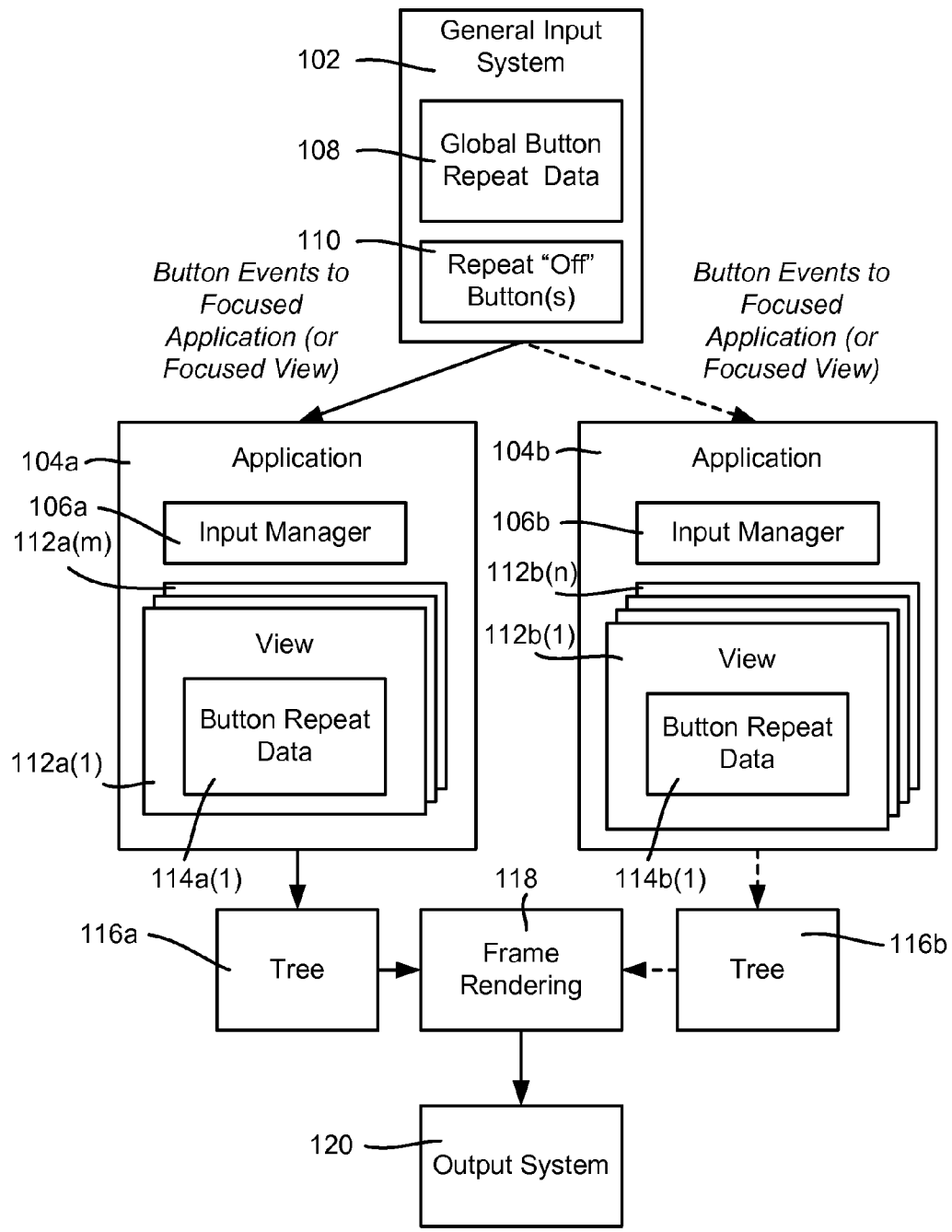
FIG. 1 shows example components that may be used to implement a button repeat system having per-view customization, according to one or more example implementations.

The technology described herein relates to a button repeat system that lets a developer set custom repeat delays per button on any user interface element, wherein a user interface element is referred to herein as a "view" comprising an object or the like. Rather than fixing one repeat delay for the entire application, each view can be styled to what a designer desires with respect to button repeat behavior, e.g., including timing (and possibly other) considerations as described herein. As used herein, "repeat" or "repeating" a button at a view refers to firing a button actuation event to the portion of the view that handles button input with respect to the user interface, as if the user repeatedly lifts and presses the button at one or more actuation frequencies. A button is the "last button still pressed" until that button is lifted or another button is pressed (or both occur), where "pressed" refers to any way that a button may be contacted so as to continue to be detected as down by the input system, e.g., held down if a physical or virtual (e.g., touch-sensitive) keyboard key, game controller button, remote controller button, touch-sensitive button, mouse or pointer button or cursor that can be held down or remain in contact or close proximity to repeat an action, and so forth.

The system works for any type of button (keyboard, mouse, remote control, gamepad key and so forth). Note that it is feasible to allow a user to modify the system for even further customization. Further, default button repeat data may be used in the event no custom button repeat data is specified for a given view.

With respect to custom delays, given the above word processor example, consider that the first repeat does not happen for (about) one second, and then the button repeats about every fifth of a second. In one or more implementations, that sort of repeat may be specified/described herein as a repeat interval set [1.0, 0.2] which means "repeat first once after one second, with every other repeat after 0.2 seconds until release" (as the last time is the interval that continues to be used until the button is no longer the last button still pressed; note that this may be because of an actual release of the button, or and effective due to the pressing of another button, such as a left arrow pressed while the right arrow was still being held down). Such a button repeat pattern may be specified for a view, which then follows that button repeat pattern. Further note that a single value may be in the repeat interval set, e.g., [0.2] means repeat after 0.2 seconds until the button being repeated is no longer the last button still pressed.

If instead it was desired to have a smooth, quadratic ramp up in speed of the repeat, the designer may specify the repeat interval set for a view (or multiple views) as [1.0, 0.5, 0.25, 0.125]. That means "repeat once after 1.0 second, then once after 0.5 seconds, then once after 0.25 seconds, and thereafter after 0.125 seconds until the button is released." Again, the last time is the interval used until the button is released.

The system may use a repeated repeat interval time in the interval set, e.g., [1.0, 1.0, 0.5, 0.5, 0.25, 0.125]. As described herein, that means "repeat after 1.0 second, then once again after 1.0 second, then repeat once after 0.5 seconds, then repeat once again after 0.5 seconds, then once after 0.25 seconds, then after 0.125 seconds until the button is released."

The repeat may be per-button, and per-instance, for example, as described via JavaScript® pseudocode:

```
var view = new ItemsView( );
view.nextTimesForButtons = {
    Buttons.LEFT: [ 1.0, 0.2 ],
    Buttons.RIGHT: [ 1.0, 0.2 ],
    Buttons.NEXT: [ 1.0, 0.5 ]
};
```

If a user held down the left or right arrow button on this ItemsView instance, the user repeats like the above word processor example, that is, act on button once, delay 1.0 second, then repeat every 0.2 seconds. However, if a user held down the "next" button (e.g., a page down button or a page up button), the designer has specified that the repeat occurs more slowly (relative to the arrow buttons), that is, act on button once, delay 1.0 second, then repeat every 0.5 seconds. Note that this is the behavior for this instance of ItemsView, not all ItemsViews. An application may have any practical number of different views/instances in the view tree (used for rendering) with different button repeat behaviors for each of them if desired, although some different views may share button repeat behaviors.

As can be readily appreciated, any button may have repeat data including an interval set specified for it. To save the designer time, rather than specifying each button individually, buttons may be combined together under one name as desired, e.g., as set forth above Buttons.NEXT may include both the page down button and the page up button, Buttons.LEFT may include the left arrow cursor, up arrow cursor and backspace button, Buttons.RIGHT may include the right arrow cursor and down arrow cursor, Buttons.QWERTY may include the characters found on a typical QWERTY keyboard, and so on. A single button may have its own interval set, e.g., Buttons.DELETE may specify a custom interval set that only applies to the delete button, for any view instance(s) that implement that Buttons.DELETE interval set.

It should be understood that any of the examples herein are non-limiting. For example, only certain types of views are referred to herein, including item views for selecting an item and text entry views, however these are only non-limiting examples and numerous other types of views may employ and benefit from the technology described herein. As such, the present technology is not limited to any particular implementations, embodiments, aspects, concepts, structures, functionalities or examples described herein. Rather, any of the implementations, embodiments, aspects, concepts, structures, functionalities or examples described herein are non-limiting, and the present technology may be used in various ways that provide benefits and advantages in computing and user interface concepts in general.

FIG. 1 shows example components that may be used to implement a button repeat system having per-view customization. A general input system 102 of a computing device provides input events (e.g., via an operating system) including button event data to an application program that has focus; (two are exemplified in FIG. 1, namely 104*a*, which as indicated by the solid arrow has focus and 104*b* (non-focused), however there may be a single application program or more than two). Each application program 104*a* or 104*b* in turn may have its own input manager, 106*a* or 106*b* respectively, which, as described herein, may perform certain operations with respect to buttons. For example, the application input manager 106*a* may provide the button input to a currently focused view within that application program.

The general input system 102 tracks global button repeat data 108 among its focused application programs 104*a* and 104*b*, e.g., so that if focus is switched among application programs, a button in a "held-down" state continues to remain in that state when switched to the newly focused application. The general input system 102 also determines whether a certain button is allowed to repeat. For example, as described herein, when some button X is pressed and held, it repeats, but stops repeating if another button Y is pressed (while X is still held down); in one or more implementations, regardless of what happens to other buttons including button Y, button X is no longer allowed to repeat until lifted up and pressed/held down again. To this end, the general input system may track which button or buttons are in a repeat "off" state, as represented by block 110. If the general input system does not provide such functionalities on a given computing platform/device, an application program's input manager 106*a* or 106*b* may do so, at least within its own application program.

Each view to which repeated buttons are applicable may be associated with button repeat data, as represented in FIG. 1 by views 112*a*(1)-112*a*(*m*) and views 112*b*(1)-112*b*(*n*), including button repeat data 114*a*(1) and 114*b*(1). If button repeat data is not specified for a particular view, default button repeat data is used if appropriate; (note that not all types of views need accept button input). In general, the views 112$a$(1)-112$a$($m$) or 112$b$(1)-112$b$($n$) may render themselves according to a hierarchical view tree 116($a$) or 116($b$), which a frame rendering system 118 processes for displaying on an output system 120.

In one or more implementations, button repeat data can be included in a property set for any desired view, whereby button repeat can be styled by a style system (e.g., like other visual properties of a view, such as color, font size, and so on). Further, to make it easier for a developer, a styling system may be implemented that allows button repeat pattern to be inherited from a higher level parent, including from a default parent.

Figure 2:
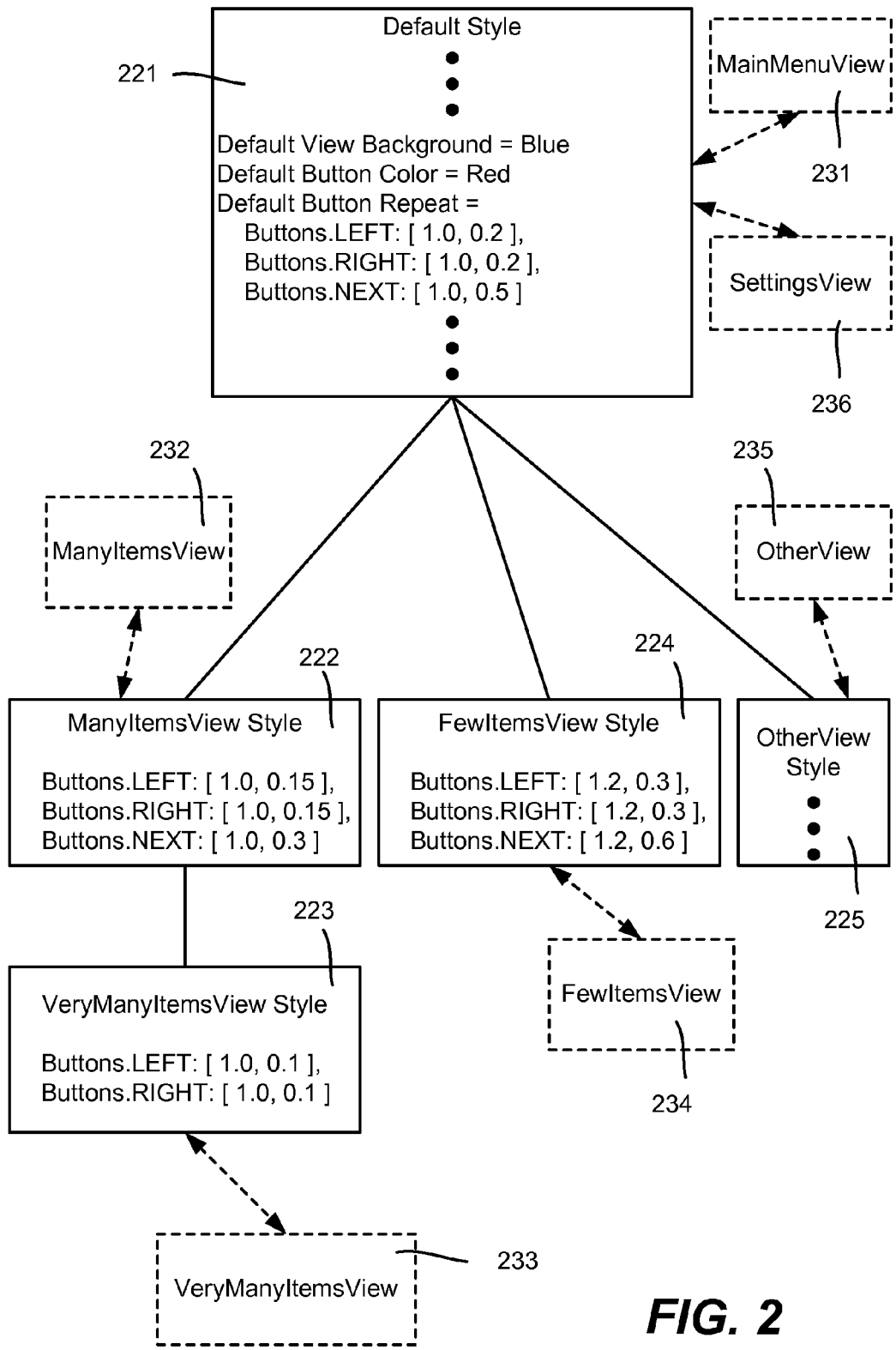
FIG. 2 is an example, generalized representation of a style inheritance hierarchy including button repeat style data, according to one or more example implementations.

A generalized representation of a style "inheritance" hierarchy is represented in FIG. 2, in which five styles 221-225 (each mapped to a corresponding view or views 231-236) are exemplified, including a DefaultView style 221, ManyItemsView style 222, VeryManyItemsView style 223, FewItemsView style 224 and OtherView style 225. In general, each style (other than the topmost DefaultView style 221) inherits styling data comprising property values from a parent, and uses those inherited values unless overridden by data within its own styling node or data within an intervening node or nodes. Note that in addition to repeat button style property values, a view may have many other styling property values, such as view background color, button color, animation data and so on; each of these are inherited, but may be overridden as well.

One of the subsets of the set of style property values comprises the button repeat property value(s). By default in the example of FIG. 2, the repeat pattern is Buttons.LEFT: [1.0, 0.2], Buttons.RIGHT: [1.0, 0.2], Buttons.NEXT: [1.0, 0.5]. However, a designer may, for example, want to override these property settings for a given view, so that, for example, for the "ManyItemsView" 232, the button repeat occurs a bit faster following the one second delay, and thus specifies that the "ManyItemsView" style property values for button repeat override the default with Buttons.LEFT: [1.0, 0.15], Buttons.RIGHT: [1.0, 0.15], Buttons.NEXT: [1.0, 0.3]. For the "VeryManyItemsView" 233, the designer wants the left and right buttons to repeat even faster, but leave the next button(s) repeat interval time the same as its parent, and thus only need specify Buttons.LEFT: [1.0, 0.1], and Buttons.RIGHT: [1.0, 0.1], (because NEXT: [1.0, 0.3] is inherited from the "ManyItemsView" style 222).

In this example, the designer also wants the "FewItemsView" buttons to repeat more slowly, and have a longer initial delay, and thus in this example specifies Buttons.LEFT: [1.2, 0.3], Buttons.RIGHT: [1.2, 0.3], Buttons.NEXT: [1.2, 0.6] in the "FewItemsView" style 224. For the "OtherView" 235, the buttons are left to the default repeat timing; note however that the "OtherView" style may override something else, such as color(s), animation, sound and so forth, and thus may have its own style rather than being mapped to the "Default" style (as are the "MainMenuView" 231 and "SettingsView" 236).

It is feasible for a user or some other state information to change the repeat button style data. For example, consider that an accessibility setting is chosen that helps a visually impaired user see items better, e.g., by having styled views with larger fonts than for non-visually impaired users. An accessibility setting similarly can slow down the designer-specified button repeat interval times, as can any other suitable criterion or criteria, e.g., device screen size, time of day, ambient light, and so on. Another user may desire faster repeat/shorter interval times or vice-versa, (which may, for example, be calibrated similar to what is done with mouse movement calibration). To this end, a global multiplying factor or the like may be used, e.g., 0.5 times each designer-specified time if the user wants double the speed, 2.0 for half the speed, and so on. Indeed, a system may allow a multiplying factor per view instead of or in addition to a global multiplying factor.

Figure 3:
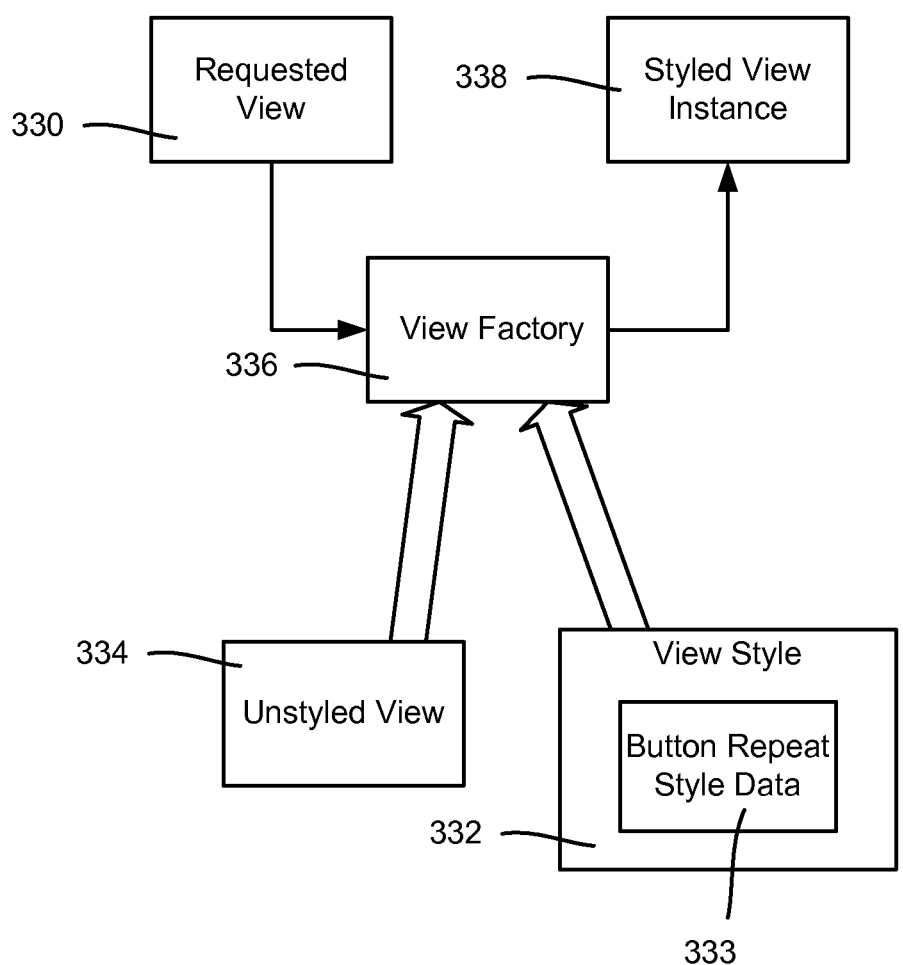
FIG. 3 is an example block diagram exemplifying a factory that produces a styled view instance including button repeat data when a view is requested, according to one or more example implementations.

To apply a style to a view, as generally represented in FIG. 3, when a view is requested (block 330) a style 332 including button repeat style data 333 may be applied to its associated "unstyled" view 334 at runtime, e.g., by an object (view) factory 336 that uses a mapping relationship between a view and its associated style to produce a styled view instance 338. For efficiency, in one or more alternative implementations, the style "tree" (e.g., FIG. 2) may be flattened during program compiling, loading or the like into static sets of style properties, each style mapped to one or more views, whereby there is no need to re-compute the view tree during runtime. This is relatively performant, as re-computing the tree for frequent actions such as focus changes consumes computing resources; (note that a view's appearance changes resulting from a focus change in the view or to a new view are also statically styled in one or more implementations of a static style system).

Note that each view's repeat behavior may also work properly "globally" even though the system gives "local" control. Note however that "global" may refer to all of (or at least certain ones of) an application's views, as well as global among all loaded applications (or at least certain ones).

Figure 4:
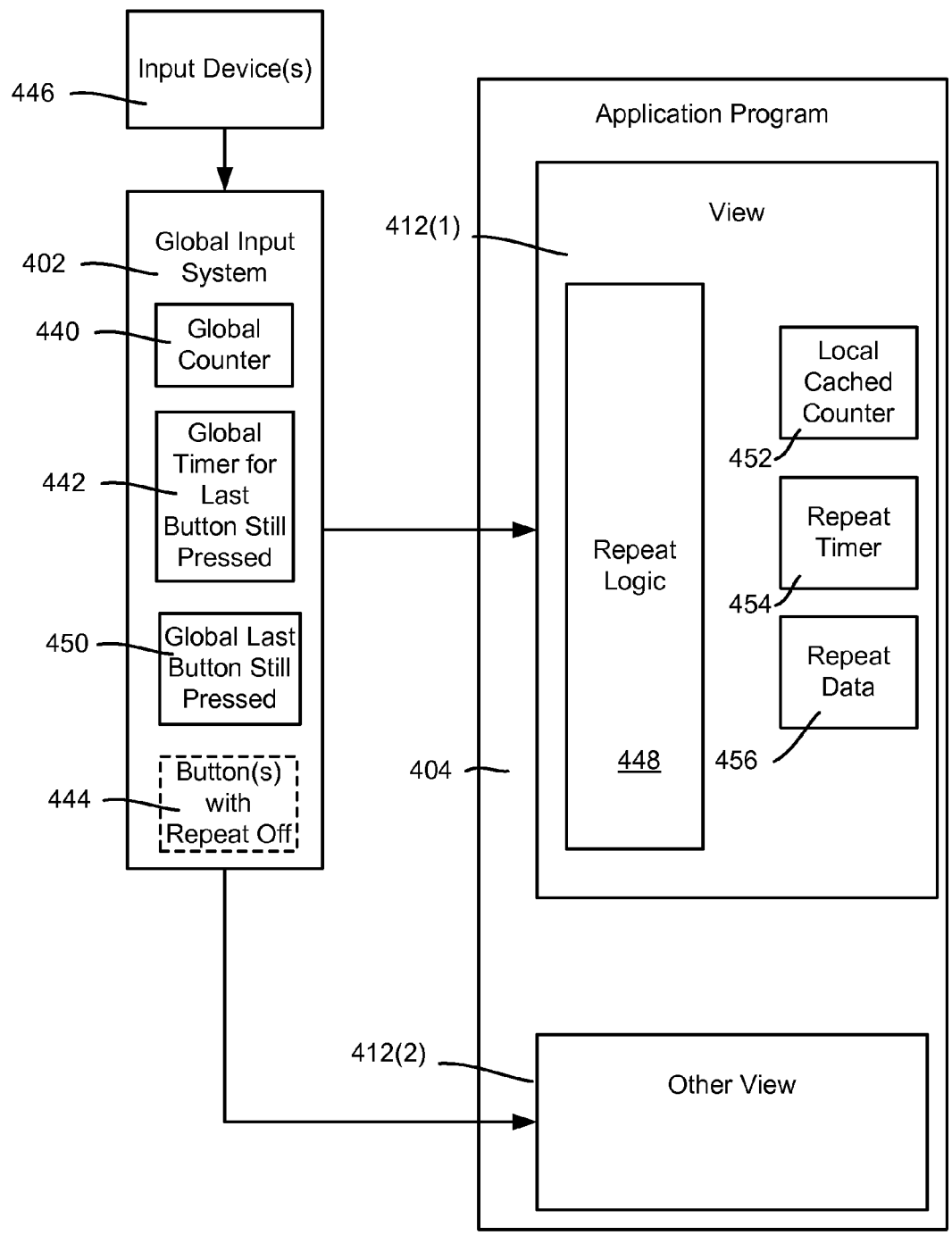
FIG. 4 is an example block diagram including a global input system and a focused view of an application program that may receive input, according to one or more example implementations.

To this end, as described herein and as represented in FIG. 4, the global button repeat data (similar to 108, FIG. 1) includes a global counter 440 that is incremented (by at least one) for each new key, possibly global timing data (e.g., as to a total length of time that the last button still pressed has been held down) 442. The global input system 402 may track this per input device 446, in the event that multiple devices are connected and in use; however, it is also feasible for the button behavior to be the same between similar input devices, e.g., a physical keyboard and a virtual keyboard may share button repeat behavior. The global input system 402 also tracks what button, if any, that is considered to be last pressed (last button still pressed) 448. Note that the global input system 402 in FIG. 2 may be global with respect to the multiple views of a single application program, and/or global with respect to different application programs (as in the input system 108 of FIG. 1). It is also feasible for the global input system to track via block 444 which button (or buttons) are not to repeat unless lifted and again pressed, however in one or more implementations this is not needed, because views know when to ignore such a button that is not to repeat; (in FIG. 4, block 444 is shown via a dashed block because this is not needed in such implementations).

As further represented in FIG. 4, as the input is received at a focused view 412(1) of an application program 404, e.g., possibly via an application program input manager or the like, the view maintains certain button-related information that is used by button repeat logic 448. This includes a local cached counter 452 that is the view's last copy of the global counter 440, a repeat timer 454 (although an external timer may be used) and repeat data 456, such as which interval is currently selected for repeat timing. Also shown in FIG. 4 is an "other" view 412(2), which may have similar repeat logic and repeat-related data for its own view instance.

In one or more implementations, correct global behavior is that button events bubble up the view tree from the current focus and, when marked handled, stop bubbling up the tree.

Figure 5A:
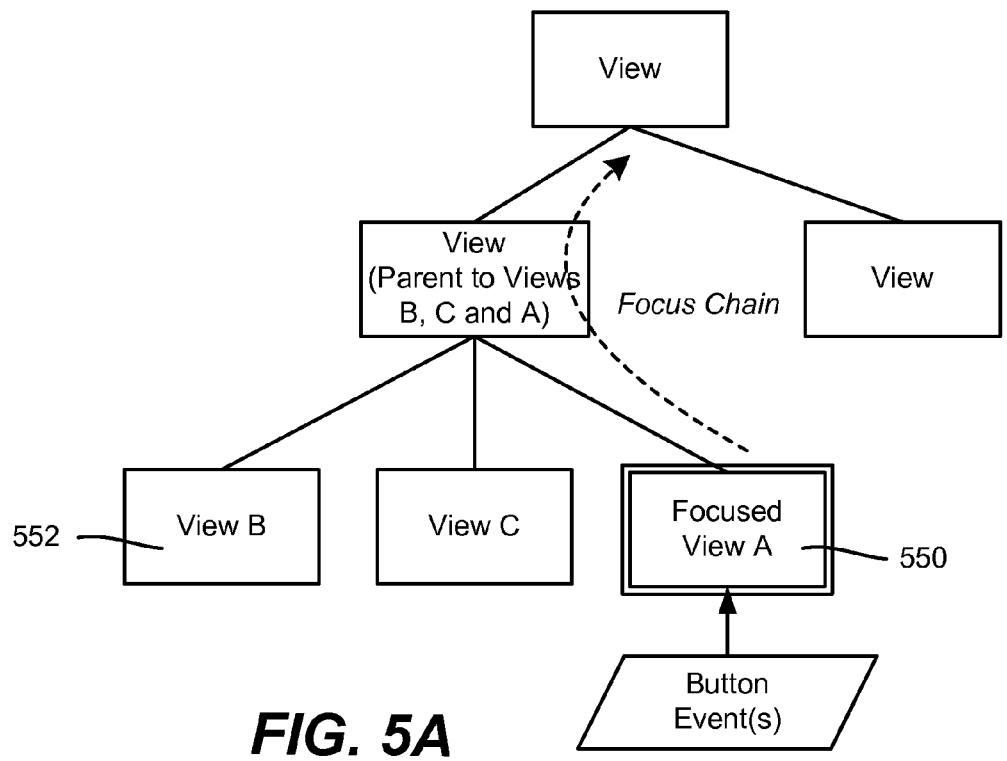
FIGS. 5A and 5B are examples of button events bubbling up a view tree from the current focus, until handled, according to one or more example implementations.

Consider that (as described above) the most recent button is to be the only one repeating. Thus, if as represented in FIG. 5A a View A 550 has focus and button X is held down, View A cares about repeating button X. If as in FIG. 5B focus gets moved to View B 552 with X still down (e.g., the user clicks on the View B 552 while holding down button X), View A 550 is no longer in the focus chain, because it is not a higher-level parent of View B 552. Thus, View A 550 stops getting button events in the situation represented in FIG. 5B. If while focused on View B 552 button Y gets held down, then (regardless of whether button X is still held down, button Y is the last button still pressed), View A 550 does not see that button Y was pressed because View A 550 is not in the focus chain. If X is again pressed, and then focus is moved back to View A 550 (FIG. 5A), View A 550 needs to know to not keep repeating button X because button Y had been pressed, even though button X was the last button View A 550 saw down and from View A's perspective, button X is still down.

To summarize typical application program rules regarding repeat, only the most recently held down button is allowed to repeat. For example, if a user holds down button X and then holds down button Y, only button Y repeats. In other words, button X's repeat is canceled (even if still held down) and button X cannot repeat again until button X is lifted up and held again. A problem arises in that if a view sees a button repeating that it cares about repeating, e.g., button X, that view needs to know whether that button continues to "matter" in that it satisfies the repeat rules, given that focus can move at any time and thus a view is not guaranteed to see input events that go up the current (changed) focus chain when the view is not part of that focus chain.

As will be understood, the generally correct behavior of not continuing button X events for a view (e.g., View A) may be handled in a number of ways. One way is a timer, e.g., it is unlikely that a user can change focus to another View B, press a different button Y, release button Y while still holding button X and return focus to View A faster than some time that is based upon the normal repeat interval of a button. If it takes too long at View A between receiving X button events, then View A may assume a focus change, and start the repeat timing over. However, this is not global in nature; e.g., it is often desirable to resume the repeating of X at the same rate in a view (such as View A) if focus is returned back to View A and button X was the last button still pressed, that is, if X continued to be held down during the focus change and no other button was pressed before focus returned.

Figure 5B:
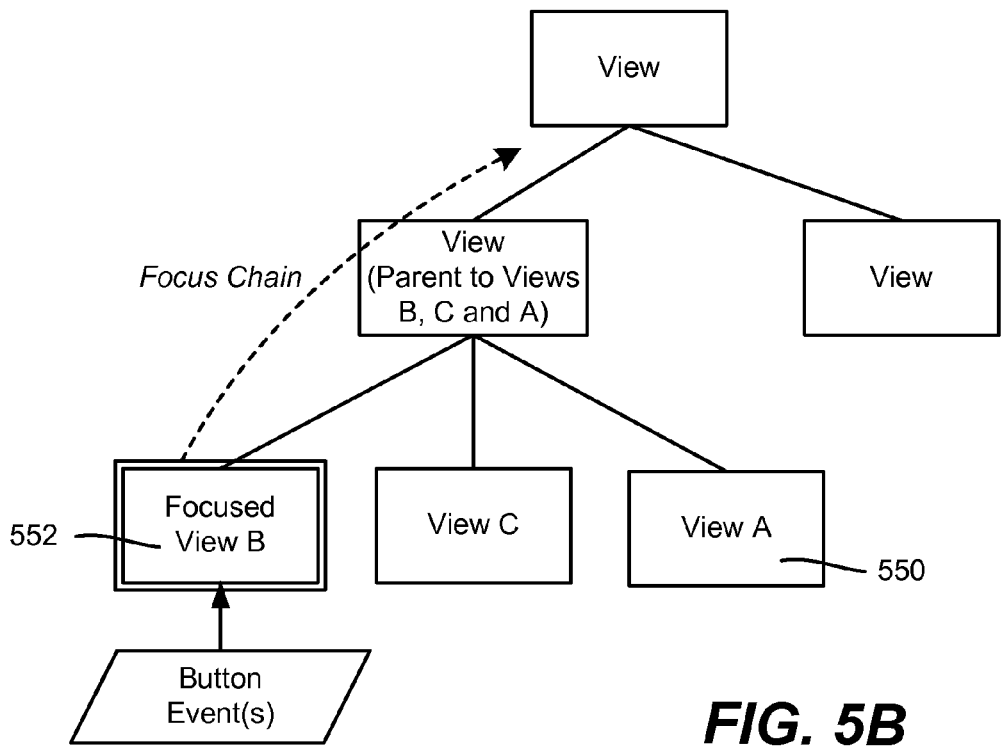

Another way is to have button change events bubble up to the top-level parent and then down to its descendants, whereby in the example of FIG. 5B, View A (among others) gets notified of any other button presses (and the focus change). To this end, on a button press, the system walks down the view tree from the root to tell all views that a new button was pressed and that the views are to reset their repeat timings. This contradicts the more straightforward concept of having input bubble up the focus chain, and is relatively inefficient, as there may be many descendants and frequent focus changes/button presses resulting in many notifications, most of which do not matter to most descendants. Further, every view may need to remember the last button still pressed (because every view sees all the button presses), which is inefficient because of the need to store the same information in each view instead of only to the view or views that are relevant to the repeat.

Still another solution is to have any view that cares about global button repeat behavior register for global button press events. On a new button press, the view is notified to reset its timing state. When the view exits the view tree, the view may be deregistered to stop listening to global button press events.

Yet another solution, as described above with reference to FIG. 4, is to have the input system keep track of the last button still pressed and to have the input system increment a counter/number every time a different button is pressed. Note that "last button still pressed" is different from the "current button pressed" in that if a user holds X (last button still pressed=X), then holds Y (last button still pressed=Y), and then releases Y, the last button still pressed is undefined. X is the "current button pressed" but not the most recent one because the most recent one (Y) is no longer pressed.

The last button still pressed provides enough information to let a view know if it is to repeat a button. Because a view also has repeat deltas, if a key is held, released, and held again, the rate at which it repeats needs to be reset. By way of example, consider that a view repeats button X for awhile, focus moves away, button X is released, button X is pressed again, and focus comes back to that original view. Although that view was repeating button X, and the last button still pressed is button X, because button X was released since the View last saw button X, the repeat timing needs to start over.

The global counter may be used so that the view knows to reset its repeat timing. To this end, when the view first started repeating button X, the view caches the global counter value. When the view sees that X is repeating again, if the cached counter value does not equal the current global counter value, then one or more other intermediate keys were pressed, or X was lifted and held down again, and thus the repeat operation starts over.

By way of example of associating a button press with a global and local counter, consider that repeating button press X in view A corresponds to a count of 200, and that button press Y corresponds to a count of 201, as incremented by globally by the input system. View A caches the count of 200 locally in association with button X. Following a focus change to View B in another focus chain, button press Y results in the count being incremented to 201, and then to 202 if X is pressed again (or even higher if there are more intermediary button presses), whereby when View A gets back focus and recognizes that button X is again being pressed, the global count of 202 (or greater) does not match the locally cached count of 200. Thus View A knows that at least one intermediate button press occurred while View A was outside of the focus chain (because of the count mismatch), and thus button X no longer "matters" with respect to the prior repeat operation. Note that the increment is similar if button X is lifted and pressed again without any intermediate button press or presses, because lifting and again pressing X similarly increases the counter (e.g., to 201 in the above example). Further note that View A also knows that a focus change occurred because it did not receive the intermediate button presses, to the extent View A may want to use such information, e.g., to restart an animation upon re-receiving focus; (although the parent also may notify a view of when it receives focus so as to render or re-render itself accordingly).

In one or more implementations, the system considers the duration of a button press to be global as well. In the above example, consider that View B also deals with button X and has a specified delay of [0.5, 0.1], and that button X had been down for 2.0 seconds before View B receives focus. When View B first sees X, one way to deal with X is to reset the timers, that is, for View B to wait its first delay (0.5 seconds) before repeating. However, because a typical user is expecting the same repeat speed to continue (or even possibly increase), in one or more implementations the system jumps to the expected repeat delay immediately. For example, because the 2.0 seconds total time is greater than the sum of View B's 0.5 plus 0.1 seconds interval times, View B directly starts repeating at its last interval, 0.1 seconds. This is done in one or more implementations so that as focus moves around the view tree, repeat delays do not reset often, which the user expects.

It should be noted that there are alternatives to the above summed duration scheme. For example, consider that View B does not have the same last interval as View A. If so, in one alternative, View A's interval may continue, at least for awhile. As another alternative, instead of using View B's last interval, a faster (but not necessarily the last) interval may be selected from View B. For example if View A was repeating every 0.3 seconds when focus changed to View B, and View B had repeat intervals of [1.0, 0.5, 0.2, 0.1], then instead of jumping to B's last interval of 0.1 seconds, the repeat interval may instead be the next interval equal to or faster than A's interval, namely 0.2 seconds in this example.

Yet another alternative is to have the button repeat data (including the interval set) specify what to do when focus returns to a view with the same last button still pressed. For example, the button repeat data may specify [1.0, 0.5, 0.2, 0.1, SKIP 0.8, SKIP 1.5, SKIP 1.6], where the value following the SKIP refers to the time to evaluate against the total time the button has been held down. Thus, in this example, if focus is received and the total time is more than 0.8 seconds but less than 1.5 seconds, skip to the second interval pointer (0.5 seconds), if more than 1.5 seconds but less than 1.6 seconds skip to the third interval pointer (0.2 seconds), if more than 1.6 seconds skip to the fourth interval pointer (0.1 seconds). Note that skipping rules may make it easier on the designer, e.g., the interval to select may correspond to the number of SKIP instructions, e.g., [1.0, 0.5, 0.2, 0.1, SKIP 1.3] means skip to the last (0.1 second interval) after 1.3 seconds because there is only one SKIP specified, and therefore it refers to the last skip. Alternatively, a different system may place or not place a SKIP time by each interval time, e.g., [1.0, 0.5, 0.2, 0.1, SKIP 0.8, SKIP 1.5, SKIP 1.6] may instead be written as [1.0, SKIP 0.8, 0.5, SKIP 1.5, 0.2, SKIP 1.6, 0.1]. If not following a focus change, the SKIP times are ignored and the interval times changes progress as normal from the first to the last. As can be readily appreciated, each view's repeat logic may be programmed to use any suitable interval selection technique upon receiving focus, based upon the information received at the view regarding the state of a held button, such as its total time.

To give the designer even more flexibility, it is feasible to allow the designer to turn off global repeat behavior/duration timing for a given view or set of views. For example, a given view can be designed to reset its repeat timing regardless of a prior button state, or ignore further button down events of the last button still pressed. Although the user may not experience typical behavior, the designer may decide to not use such typical behavior. By way of example, consider that the user is holding down a button that is relatively benign if repeated in one view but takes some action if repeated in another view that the designer may consider unsafe (e.g., erases data that cannot be recovered, or possibly selects an internet link that may be unsafe). For such a "potentially unsafe" view, the designer may choose to ignore repeated buttons entirely unless lifted and pressed down again, or may choose to reset the repeat timing. One way this may be done is to specify the behavior in the repeat data, e.g., [RESET, 1.0, 0.2] means reset to the first interval time specified thereafter regardless of any prior button holding and focus changing. Another example may be [NOREPEAT, 1.0, 0.2], which means ignore a repeated key following a focus change to a view having that repeat property value and ensure that only a different key (or the same key lifted and pressed again) while in the view can repeat; (a timer may be used to assume a focus change if a given system does not directly inform a view of when it receives focus).

Turning to alternative aspects, in one or more implementations, a button repeat system further may allow the specifying of recurring repeat times. For example, instead of having a designer specify one recurrence per each specified repeat time, an alternative is to specify how many repeats are to be performed (recur) for each specified time, (e.g., using once by default if not specified, except for the last time which continues indefinitely until canceled). For example, instead of having one recurrence per specified repeat interval time, an additional recurrence parameter may be specified that indicates a recurring number for a repeat time:

```
var view = new ItemsView( );
view.nextTimesForButtons = {
    Buttons.LEFT: [ 0.4, 10x, 0.3, 0.2],
    Buttons.RIGHT: [ 1.0, 0.2 ],
    Buttons.NEXT: [ 1.0, 3x, 0.5 ]
};
```

In the above example, if the LEFT button is pressed and continues to be pressed for a sufficient length of time, the operation is to provide the left button once and then repeat of the button press after 0.4 seconds, for ten times (because the 10× recurrence parameter is specified), then repeat after 0.3 seconds once (1× by default since no recurrence parameter is specified), then continue to repeat every 0.2 seconds indefinitely until the button press is canceled. If the RIGHT button is held, the operation is to repeat after 1.0 second one time (because no recurrence parameter is specified, 1× is the default recurrence pattern), then repeat after 0.2 seconds indefinitely until canceled. If a NEXT button is pressed, the operation is to repeat the button press after 1.0 seconds, three times (because the 3× recur parameter is specified), then repeat after 0.5 seconds indefinitely until canceled.

As can be readily appreciated, the repeat interval times may be specified by the designer to increase (rather than decrease or stay the same) until canceled. For example, consider that a user is holding the same button down for what is likely an unusual amount of time, e.g., the user is likely "lost" within a large selection menu. Using the above recurrence example, the designer may specify a button repeat style as [1.0, 0.2, 400×, 0.5, 30×, 0.2]. This means that the user will experience a 1.0 second delay before the next button down event is fired, followed by a shorter 0.2 delay for 400 times, followed by a longer 0.5 second delay for 30 times, followed by a faster 0.2 delay indefinitely. As can be seen, after "typical" behavior for 400 times of 0.2 second repeats, the button repeat slows down for 30 times, then resumes. While this may not be a common repeat behavior in typical scenarios, it is seen from this example that the button repeat system described herein provides significant flexibility to a designer in this regard.

In one or more implementations, other actions related to button repeat may be specified. For example, a designer may specify an "END" to the automatic repeat, e.g.: [1.0, 0.2, 400×, END], such as reduce the use of unnecessary computing resources. For example, consider an item selection menu that the designer designs to not contain more than 400 items; there is no point in extra processing of a cursor button or the like that is already at the end of the item selection menu and results in no change to the current focus/selection. The END effectively stops (most of) the button repeat handling until the user does something else such as press a different button. Note that instead of an actual "END," having the 400× recurrence listed as the last-specified value, e.g., [1.0, 0.2, 400×] may imply an "END"—however such a scheme may lead to an unintended "END" (as opposed to a scheme than simply ignores a "last-specified" recurrence value).

Further, note that "END" whether implied or actual also may be coupled with some action, e.g., display a "Help" dialog. Consider for example that a menu is designed to have no more than 100 items therein, and using the above [1.0, 0.2, 400×] example with the maximum of 100 items the user reaches the last item in just under twenty-one seconds, whereby the button repeat is thereafter ignored (because cursor/item focus wraparound behavior is not desired for this menu). However, the 400× recurrence means that the button repeat logic continues, although the button itself is ignored, for 301 more times (just over a minute more). At this point the designer, possibly through user testing, presumes that the user is likely lost or the button is manually or programmatically stuck, and thus triggers a "Help" dialog or the like, e.g., [1.0, 0.2, 400×, END, "Help_Dialog" ]; (again, END may be implied, e.g., [1.0, 0.2, 400×, "Help_Dialog" ] may provide the same action). Thus, the action taken in this example is to provide a "Help" dialog after the button repeat appears to be "stuck" for over a minute.

In the above example, the cursor/item focus wraparound behavior was not desired; however another possible action following a last recurrence may be to wraparound the cursor/item focus to attempt to help the user, e.g.: [1.0, 0.2, 400×, WRAP], or to combine both actions, e.g.: [1.0, 0.2, 400×, WRAP, 1.0, 0.2, 400×, END, "Help_Dialog" ]. Here, for example, "WRAP" may mean to go back to a first item if the user appears to be "stuck" at the last item for too long while still attempting to move past the last item, or vice-versa. This only happens once in the above example, as the second time it occurs a "Help" dialog is instead presented to the user.

Still further, it can be readily appreciated that time values instead of or in addition to recurrence values may be used. Thus, for example, [1.0, 0.2, 30 s, 0.1] may be processed (while the button is still held) as "repeat once after one second, repeat every 0.2 seconds for 30 seconds, and thereafter repeat every 0.1 seconds." Another alternative allows mixing both recurrence and time, e.g., [1.0, 0.2, 400×, WRAP, 1.0, 0.2, 120 s, END, "Help_Dialog" ], which may be processed (while the button is still held) as "repeat once after one second, repeat every 0.2 seconds for 400 times seconds, then WRAP, repeat once after one second, repeat every 0.2 seconds for 120 seconds and thereafter stop and output the "Help_Dialog." In some situations it may be easier for a designer to use time, such as if the number of items is indeterminable in advance, but the designer generally knows that no normal view should have the same button held down for more than two minutes.

Figure 6:
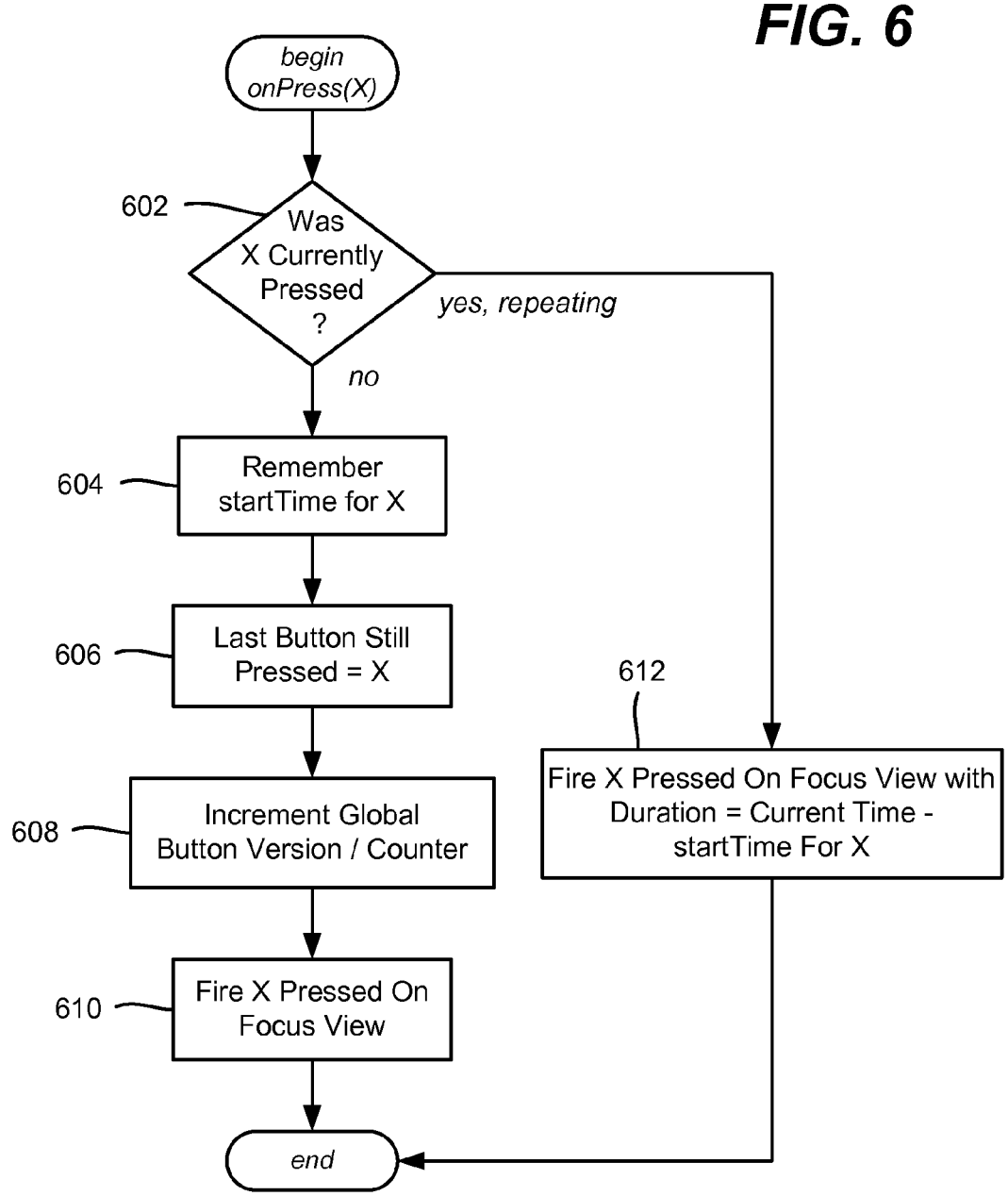
FIG. 6 is a flow diagram showing example steps related to providing button presses to a focused application, according to one or more example implementations.

Turning to example repeat logic, FIG. 6 is a flow diagram having example steps related to how the input system provides button presses to the focused application, e.g., a focused one of its views, along with button-related data. Step 602 represents determining whether the current button X being pressed (there may be multiple ones detected at the input system) is an initial press or is a repeating press.

If the button being handled is not repeating, step 604 remembers the start time for this button, that is, the current time, and step 606 remembers that this button is the last button still pressed. Step 608 increments the global counter 440 (FIG. 4), and step 610 fires X to the focused view.

If a repeating button, step 612 is instead executed. Step 612 fires X to the focused view, but also includes a duration of the held button, which is the current time minus the startTime (previously saved at step 604 when initially pressed).

Figure 7:
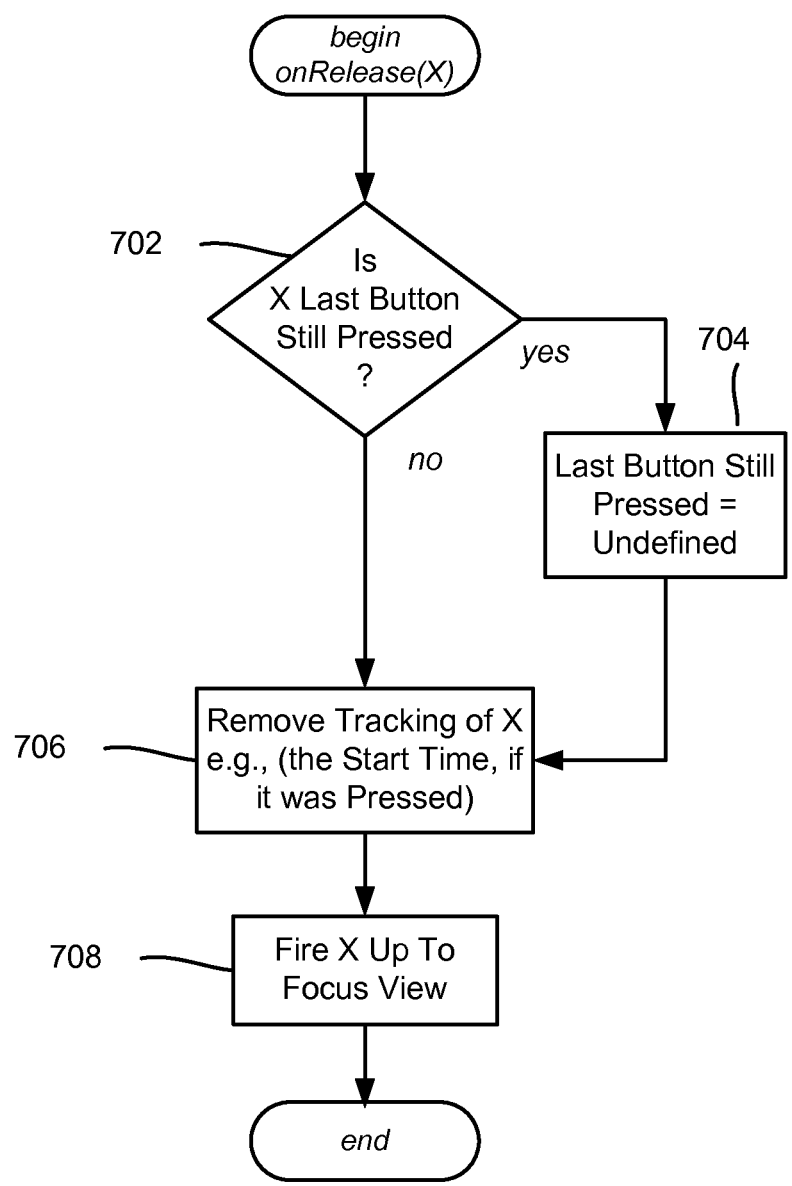
FIG. 7 is a flow diagram showing example steps related to providing a button up handling mechanism, according to one or more example implementations.

A button may be lifted at any time. FIG. 7 provides the input system with a button up handling mechanism to recognize and react to the button lift, e.g., allow repeat if turned off. Step 702 evaluates whether the lifted button X is the last button still pressed (as previously recorded if no intervening button changed the last button still pressed identifier via step 606). If not, the last button still pressed is set to undefined. Step 706 removes the tracking of the lifted button X e.g., the startTime for X. Step 708 lets the focused view know that button X has been lifted.

Figure 8:
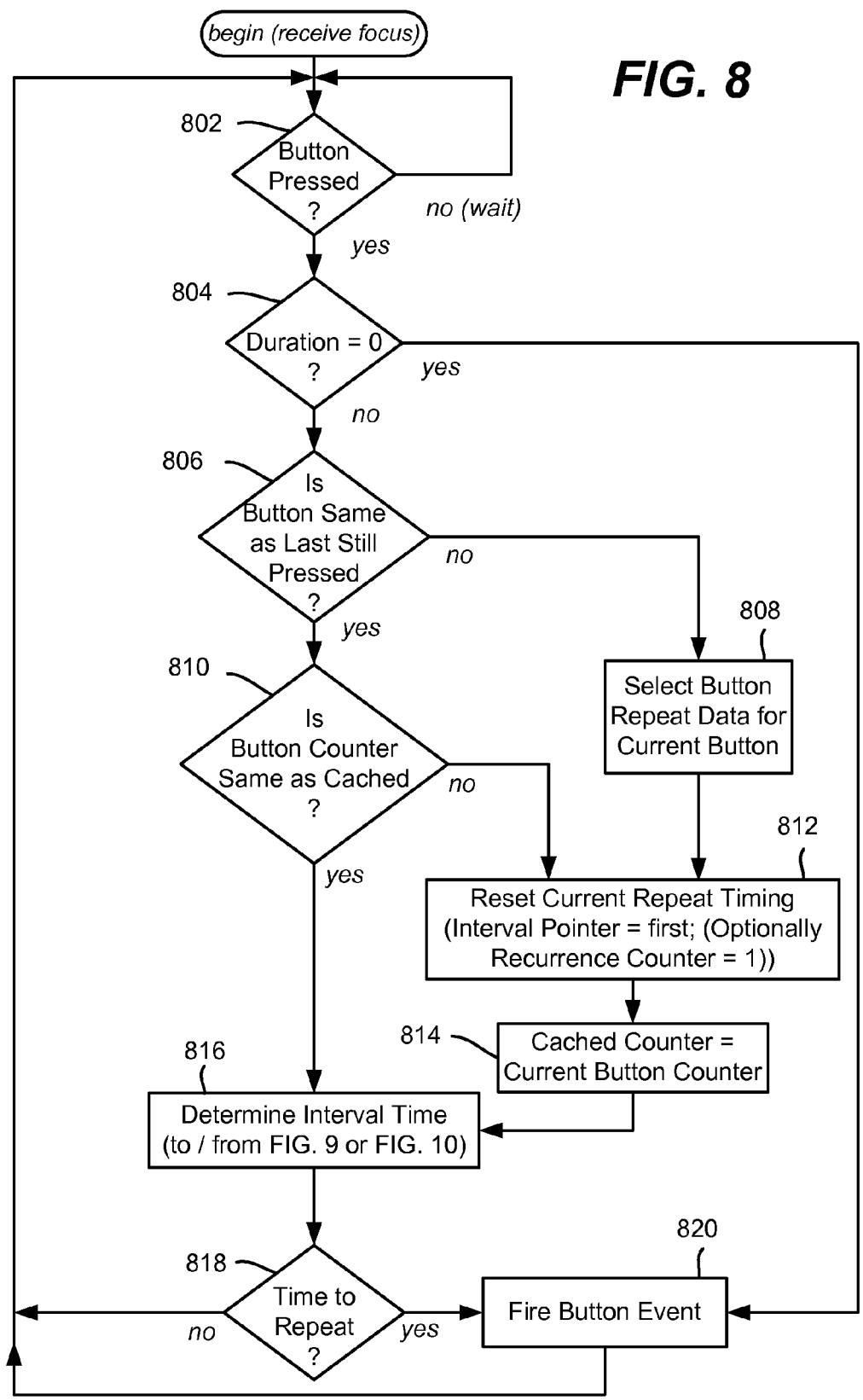
FIGS. 8-10 comprise flow diagrams showing example steps for how a focused view handles button press input (FIG. 8), including selecting an appropriate interval time to use from interval data for each interval (FIG. 9), or via interval data that may include recurrence information (FIG. 10), according to one or more example implementations.

FIG. 8 represents how the focused view handles button press input with respect to initial press and repeat operations, beginning at step 802 where the view "waits" for a button pressed event. Note that instead of actual looping, the logic may be event driven, that is, a button event may be used to trigger the rest of the logic of FIG. 8.

Step 804 evaluates the duration, which if zero, means that the button is first pressed. If so, step 804 branches to step 820 to fire the button event right away.

If a repeating button, step 806 begins processing the button press event, by evaluating whether the button event corresponds to the last button still pressed. In the above examples, a view "cares" about repeating a button that remains pressed, and thus step 806 basically compares the input button with the one the view previously cared about. If not the same, then this is a new repeating button (the button was changed when focus was elsewhere), and the process branches to step 808 to select the button repeat data (including the interval set) that corresponds to this new button, and then to step 812 as described below.

If the button is the same, step 810 further evaluates whether the global button counter (received with the button event from the input system as described above) indicates by comparison with the cached button counter that the button is indeed the same held button or whether something else was pressed while focus was changed.

If either deemed a "new" button press via step 806 or 808, step 812 resets the current repeat interval timing, by setting the interval timer pointer to the first interval. Optionally, if recurrence is allowed in a given system, the recurrence counter is also reset to the first value, e.g., one. Step 814 saves the new global counter value as the cached value, and continues to step 816 as described below.

Figure 9:
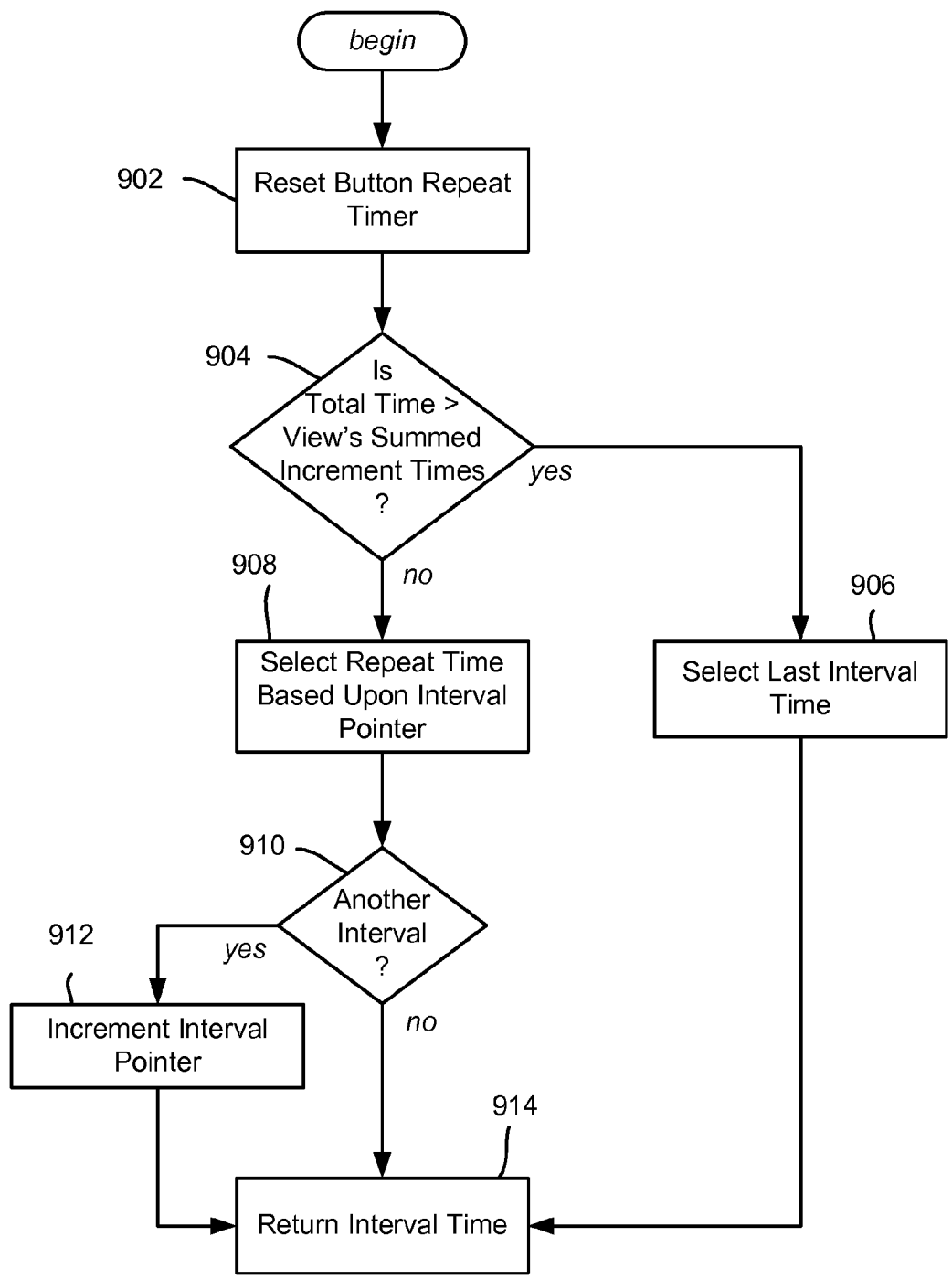
Figure 10:
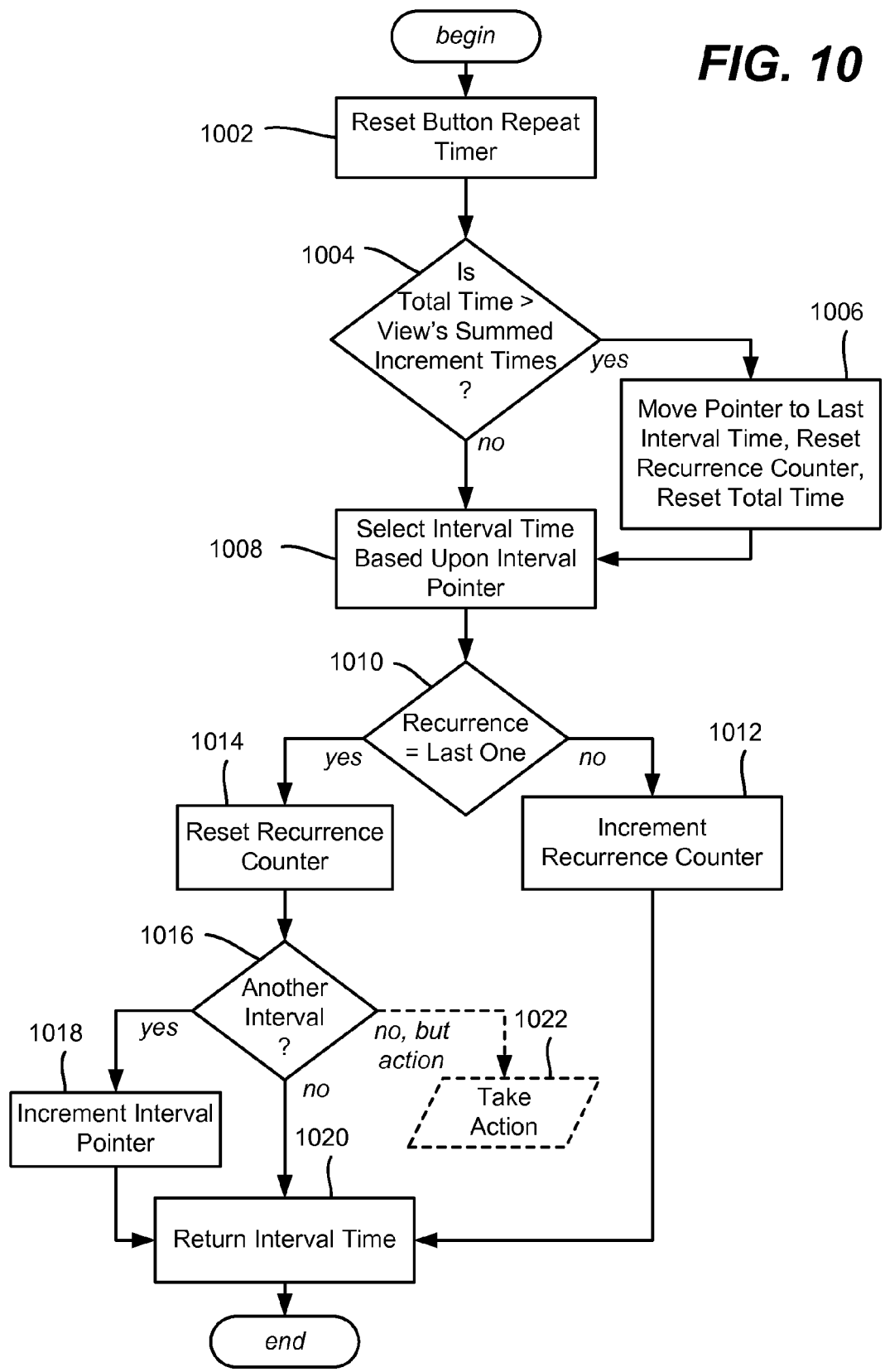

Returning to step 806, if determined to be a held button that has remained held, including through any focus change, step 816 is performed to determine what interval time is appropriate at this point, which may be one that is selected without resetting to the first interval time. Interval times are processed via FIG. 9 (each interval specified only once, no recurrence) or FIG. 10 (each interval specified with an optional recurrence). FIGS. 9 and 10 are described below; in general, each resets a repeat timer and returns an interval time to use.

Step 818 compares the interval time with the repeat timer's time; if not time to repeat, step 818 returns to step 802. Note that as described above, the first time a new key is pressed (duration equals zero) the key is immediately fired as a button actuation event at step 820, that is, used by the rest of the view button input handler as appropriate, (e.g., to scroll, change focus, select and so on); thereafter, a repeat interval time is determined and used if the button continues to be the last button still pressed. For a repeating button, when the interval time is reached at step 818, step 820 is executed to fire the button event in the view. The process then returns to step 802.

FIG. 9 represents selecting the appropriate interval time to use, which as described herein, may change as specified by a designer. Step 902 resets the button repeat timer.

Step 904 evaluates whether the total time (received from the input system) is greater than the sum of the view's increment times. If so, at step 906 the last specified increment time is selected as the time to compare against the repeat timer; this time is returned at step 914. As described above, this avoids resetting the repeat interval as focus moves around the view tree while the same button is held. As also described above, instead of using the summed time to sometimes select the last interval time, steps 904 and 906 can use different logic and/or select a different interval time based upon other criteria, such as the last focused view's interval time (provided the new view knows the last focused view's interval time).

If (as in the likely most frequent situation) a view is going to use at least the first of its specified interval times, step 908 is executed to select the interval time based upon the interval pointer. Note that step 810 of FIG. 8 resets the interval pointer to one for a new key. Thus, in the example above having the specified intervals of [1.0, 0.5, 0.25, 0.125], the first pointer points to 1.0, and if the button is still held down, the pointer moves to 0.5, then to 0.25 and 0.125 where it remains.

To this end, after the interval pointer is used to determine/select the repeat time, step 910 evaluates whether there is another interval specified. If so, step 912 moves the pointer forward in the list, so that the next interval will be used if and when step 908 is next executed. Step 914 returns the interval time to step 816 of FIG. 8 for use in delaying the repeat until the repeat time is reached.

FIG. 10 is similar to FIG. 9 in that an interval time is returned to step 816 of FIG. 8, however FIG. 10 includes the concept of recurrence. Step 1002 resets the button repeat interval timer. Step 1004 evaluates whether the total time (received from the input system) is greater than the sum of the view's increment times. If so, at step 1006, instead of returning this time directly, the interval pointer is moved so that the last specified interval time will be selected as the time to compare against the repeat timer. Step 1006 also resets the recurrence counter and resets the total time (so that step 1006 is not executed again for this button). This allows recurrence to be a factor going forward, in case some action is desired following the last recurrence, if any is specified, of the last specified interval time.

Step 1008 selects the interval time based upon the interval pointer, whether the first interval time pointer is used via step 810, or one that is incremented via looping (as described below with respect to step 1018), or is the last interval pointer via step 1006.

Before returning the interval time, step 1010 evaluates whether the counter has reached the last recurrence value, that is, whether the specified interval has recurred the specified number of recur times (the last recurrence value is one if not specified). If not, step 1012 increments the recurrence value, and returns the interval time via step 1020. Thus, recurrence takes place up to the specified amount of times, as long as the button remains held down, without changing the interval pointer. Note that if a specified recurrence time is instead specified, step 1010 can instead evaluate the time against a recurrence timer, step 1012 may be skipped, and step 1018 (and step 810 of FIG. 8) may also reset the recurrence timer.

When the recurrence value is reached at step 1010, (recurrence equals one if not specified in this example implementation), step 1014 resets the recurrence counter, e.g., to one. Step 1016 checks whether there is another interval, and if so, step 1018 moves up the interval pointer to point to it for the next time step 1008 may be executed. Note that the logic skips the interval pointer over the recurrence value if the specified list is maintained as is. If there is no further interval, the last interval is returned at step 1020 and continues to be used as long as the button remains held down, (unless an implementation allows an action to occur).

In the event that an implementation allows there to be a specified action (as described above) and one is specified following the last recurrence of the last specified interval time, step 1016 instead branches to step 1022 to take the action. Thus, using the above examples, if [1.0, 0.2, 400×, 0.5, 30×, 0.2] is specified, once the last interval is selected, steps 1016 and 1020 continue to return 0.2 as the interval time (as long as the button remains held down) because no action is specified. However, if instead [1.0, 0.2, 400×, "Help_Dialog"] is specified for a view, once the last interval of 0.2 is selected, via step 1012 the recurrence of the 0.2 interval takes place 400 times (provided the button remains held down), at which time step 1016 branches to step 1022 to take the specified action.

As can be seen, the technology described herein provides per-view instance custom button repeat delays. A designer can thus implement button repeat delay times and other behaviors that are designed for each view, rather than limited to the same repeat behavior for all views of an application. The button repeat data for a view may be part of a style for a view, that is, the properties that determine the view's appearance and behavior, and styles may be hierarchically arranged to allow inheritance of style property values (including button repeat values) from higher styles and overriding of those style property values as desired.

One or more aspects are directed towards obtaining button event data at a view, in which the button event data corresponds to a button that is a last button still pressed, and using button repeat data including a repeat interval set comprising at least two repeat intervals associated with the button and the view to determine a first repeat interval for the button and a second repeat interval for the button. The button is repeated at the view based upon the first repeat interval, and the button is repeated at the view based upon the second repeat interval.

The button repeat data including the repeat interval set associated with the button and the view may be used to determine a last repeat interval for the button. The button may be continue to be repeated at the view by repeatedly using the last repeat interval until the button is no longer the last button still pressed.

Focus may be switched from the view to another view, and back to the view. Upon receiving other button event data, described herein is determining from the other button event data that the button event data still corresponds to the last button still pressed, and repeating the button at the view without resetting to the first repeat interval for use in determining when to repeat the button at the view. Determining from the other button event data that the button event data still corresponds to the last button still pressed may include saving cached information (e.g., a button count value) corresponding to the last button still pressed at the view, and evaluating global button event information (e.g., a global button count value) against the cached information to determine whether at least one other button was pressed while focus was switched or whether the last button still pressed was lifted while focus was switched.

Repeating the button at the view without resetting to the first repeat interval may include skipping to a repeat interval in the interval set other than the first repeat interval. The skipping may be based upon information associated with the button event data, including information that represents a length of time that the button has been the last button still pressed.

The button repeat data may be associated with the view via style property data associated with the view. If so, a styled view instance may be created based upon the style property data associated with the view.

The button repeat data may be specified for a particular button or subset of buttons, whereby using the button repeat data including the repeat interval set may include selecting the button repeat data for the last button still pressed.

Repeating the button at the view after the second repeat interval may include repeating the button at the view for a specified recurrence number of times, or for a specified length of time.

The button repeat data including the repeat interval set associated with the button and the view may be used to determine a last repeat interval for the button. Described is an alternative of continuing to repeat the button at the view by repeatedly using the last repeat interval for a specified recurrence number of times, or for a specified length of time, and taking an action after the recurrence number of times or specified length of time.

One or more aspects are directed towards a global input system and a plurality of views of an application program, each view coupled to receive input event data from the global input system when that view is a focused view having current focus. The input event data includes button event data that identifies when a button is pressed. The focused view includes (or is coupled to) button repeat logic that handles button event data received from the global input system, including to select button repeat data that is associated with the view for the button. The button repeat data includes a repeat interval set used by the button repeat logic to determine when to repeat a button at the view that is a last button still pressed. The interval set comprises data corresponding to one or more repeat interval times from which the button repeat logic determines when to repeat the button.

The global input system may maintain a global counter incremented for each new key that changes the last button still pressed, and/or a global timer that represents how long a button is the last button still pressed. If the focus changes to one or more different views and returns back to the view with a button identifier that indicates that the last button still pressed has not changed (to a new button identifier) when focus returned to the view, and the global input system returns a global counter value corresponding to the global counter to the view as part of the button event data, the view logic uses the global counter value and a view-cached counter value to determine whether the last button still pressed remained pressed while focus was changed to the one or more different views.

The interval set may comprise a plurality of interval times, whereby the view may reset to a first interval time of the interval set when the global counter indicates that the last button still pressed did not remain pressed while focus was changed to the one or more different views. The view logic may instead select an interval time that is other than the first interval time when the global counter indicates that the last button still pressed remained pressed while focus was changed to the one or more different views; the button event data may include global timer data, and the view logic may select the interval time (other than the first interval time) based at least in part upon the global timer data.

The button repeat data associated with the view may further includes button recurrence information related to how many times an interval time is to be reused or for how long an interval time is to be reused, interval skip information related to interval selection upon focus returning to the view, interval reset information related to resetting to a first interval time upon focus returning to the view, information that indicates that the last button still pressed is not to repeat when focus returns to the view until the last button still pressed is no longer pressed or is no longer the last button still pressed, and/or (e) an action to take instead of repeating the button.

If the focus changes to one or more different views and returns back to the view with a button identifier that indicates that the last button still pressed has not changed to a new button identifier when focus returned to the view, the view logic may register for button change events to determine whether the last button still pressed remained pressed while focus was changed to the one or more different views. If the focus changes to one or more different views and returns back to the view with a button identifier that indicates that the last button still pressed has not changed to a new button identifier when focus returned to the view, the view logic may be configured to receive button change events from a higher-level parent view in a view tree, in which the view is represented, to determine whether the last button still pressed remained pressed while focus was changed to the one or more different views.

The button repeat data may be associated with the view via style property data associated with the view. A view factory may return a styled view instance of the view based upon the style property data.

One or more aspects may be directed towards:

(a) receiving button event data at a view that identifies a button as a last button still pressed, and outputting an initial button event at the view;

(b) selecting a starting interval time from an interval set associated with the view and associated with the button as a selected interval time;

(c) using the selected interval time to repeat the button at the view based upon the selected interval time;

(d) determining if a next interval time exists in the interval set, and if so, selecting the next interval time as the selected interval time; and (e) using further button event data to determine whether the button is the last button still pressed, and if so, returning to step (c) until the button event data indicates that the button is no longer the last button still pressed.

Selecting the starting interval time from the interval set may include choosing the starting interval time from the interval set based at least in part upon a total time the last button still pressed has remained pressed, including time pressed in at least one other view.

EXAMPLE COMPUTING DEVICE

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 11 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 11:
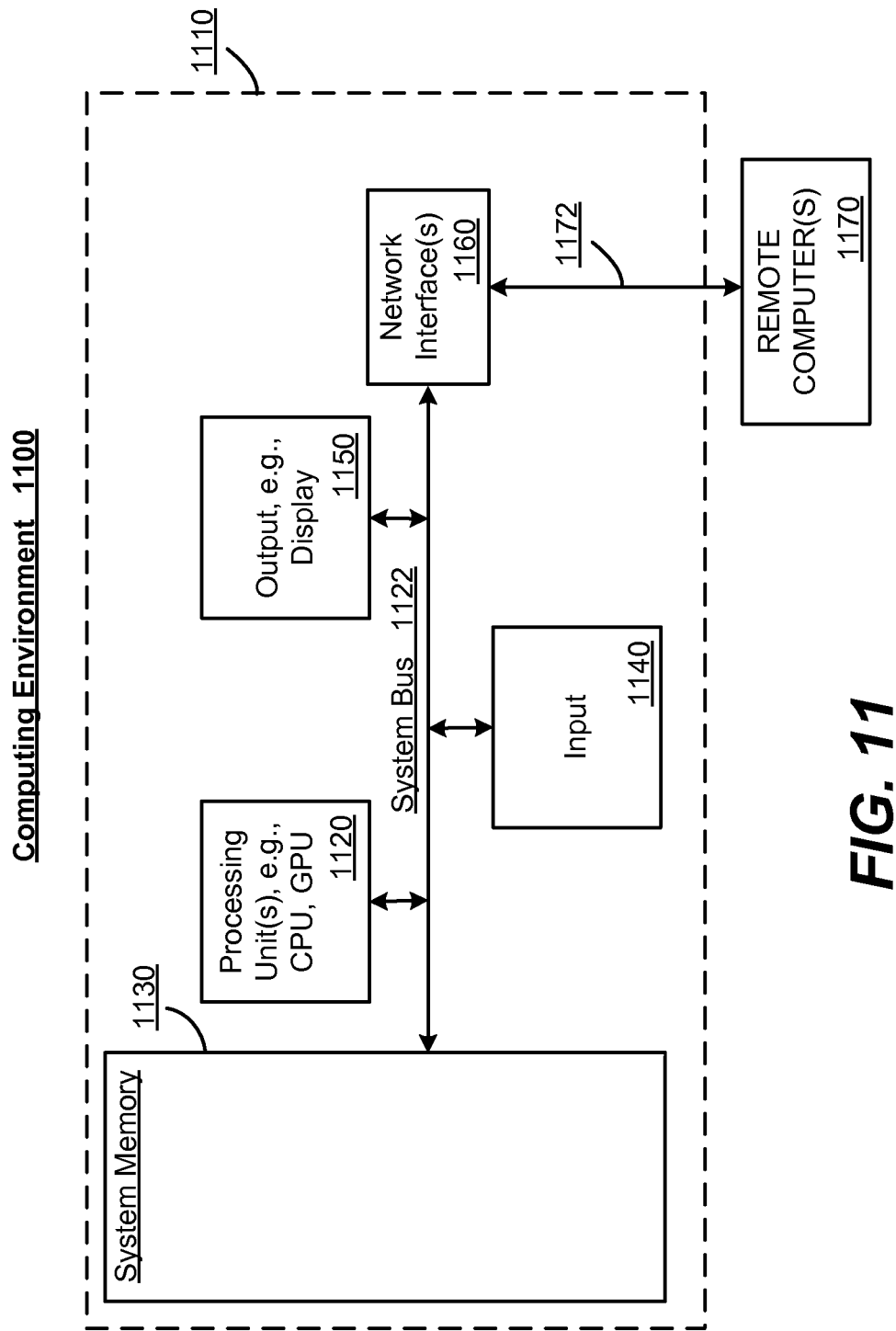
FIG. 11 is a block diagram representing an example computing environment into which aspects of the subject matter described herein may be incorporated.

FIG. 11 thus illustrates an example of a suitable computing system environment 1100 in which one or aspects of the embodiments described herein can be implemented, although as made clear above, the computing system environment 1100 is only one example of a suitable computing environment and is not intended to suggest any limitation as to scope of use or functionality. In addition, the computing system environment 1100 is not intended to be interpreted as having any dependency relating to any one or combination of components illustrated in the example computing system environment 1100.

With reference to FIG. 11, an example device for implementing one or more embodiments includes a general purpose computing device in the form of a computer 1110. Components of computer 1110 may include, but are not limited to, a processing unit 1120, a system memory 1130, and a system bus 1122 that couples various system components including the system memory to the processing unit 1120.

Computer 1110 typically includes a variety of machine/computer-readable media and can be any available media that can be accessed by computer 1110. The system memory 1130 may include computer storage media in the form of volatile and/or nonvolatile memory such as read only memory (ROM) and/or random access memory (RAM), and hard drive media, optical storage media, flash media, and so forth. By way of example, and not limitation, system memory 1130 may also include an operating system, application programs, other program modules, and program data.

A user can enter commands and information into the computer 1110 through one or more input devices 1140. A monitor or other type of display device is also connected to the system bus 1122 via an interface, such as output interface 1150. In addition to a monitor, computers can also include other peripheral output devices such as speakers and a printer, which may be connected through output interface 1150.

The computer 1110 may operate in a networked or distributed environment using logical connections to one or more other remote computers, such as remote computer 1170. The remote computer 1170 may be a personal computer, a server, a router, a network PC, a peer device or other common network node, or any other remote media consumption or transmission device, and may include any or all of the elements described above relative to the computer 1110. The logical connections depicted in FIG. 11 include a network 1172, such as a local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. A method performed at least in part on at least one machine, comprising:
assigning a first user interface element of an application to a first repeat interval set associated with a button, the first repeat interval set comprising at least two intervals associated with the button and the first user interface element;
assigning a second user interface element of the application to a second repeat interval set associated with the button, wherein the second repeat interval set is different from the first repeat interval set;
obtaining button event data at the first user interface element, in which the button event data corresponds to a button that is a last button still pressed;
using button repeat data comprising the first repeat interval set to determine a first repeat interval for the button and a second repeat interval for the button;
repeating a function of the button at the user interface element based upon the first repeat interval while the button is the last button still pressed;
repeating the function of the button at the user interface element based upon the second repeat interval while the button is the last button still pressed; and
using the button repeat data including the first repeat interval set associated with the button and the first user interface element to determine a last repeat interval for the button, and continuing to repeat the function of the button at the first user interface element by repeatedly using the last repeat interval until the button is no longer the last button still pressed.

2. The method of claim 1 further comprising, switching focus from the first user interface element to the second user interface element, switching focus back to the first user interface element including receiving other button event data, determining from the other button event data that the button event data still corresponds to the last button still pressed, and repeating the function of the button at the first user interface element without resetting to the first repeat interval for use in determining when to repeat the function of the button at the first user interface element.

3. The method of claim 2 wherein determining from the other button event data that the button event data still corresponds to the last button still pressed comprises saving cached information corresponding to the last button still pressed at the first user interface element, and evaluating global button event information against the cached information to determine whether at least one other button was pressed while focus was switched or whether the last button still pressed was lifted while focus was switched.

4. The method of claim 2 wherein repeating the button at the first user interface element without resetting to the first repeat interval comprises skipping to a repeat interval in the first repeat interval set other than the first repeat interval based upon information associated with the button event data, including information that represents a length of time that the button has been the last button still pressed.

5. The method of claim 1 wherein the button repeat data is associated with the first user interface element via style property data associated with the first user interface element, and further comprising, creating a styled first user interface element instance based upon the style property data associated with the first user interface element.

6. The method of claim 1 wherein the button repeat data is specified for a particular button or subset of buttons, and wherein using the button repeat data including the first repeat interval set comprises selecting the button repeat data for the last button still pressed.

7. The method of claim 1 wherein repeating the button at the first user interface element after the second repeat interval comprises repeating the button at the first user interface element for a specified recurrence number of times, or for a specified length of time.

8. The method of claim 1 further comprising, using the button repeat data including the first repeat interval set associated with the button and the first user interface element to determine a last repeat interval for the button, continuing to repeat the button at the user interface element by repeatedly using the last repeat interval for a specified recurrence number of times, or for a specified length of time, and taking an action after the recurrence number of times or specified length of time.

9. A system comprising:
a processor; and
a memory communicatively coupled to the processor, the memory having stored therein computer-executable instructions, comprising:
a global input system;

a plurality of user interface elements of an application program, each user interface element coupled to receive input event data from the global input system when that user interface element is a focused user interface element having current focus, including button event data that identifies when a button is pressed, the plurality of user interface elements comprising a first user interface element assigned to a first repeat interval set for the button and a second user interface element assigned to a second repeat interval set for the button, wherein the second repeat interval set is different from the first repeat interval set;

the first user interface element, when focused, including or coupled to button repeat logic that handles button event data received from the global input system, including to select button repeat data that is associated with the first user interface element for the button, the button repeat data comprising the first repeat interval set used by the button repeat logic to determine when to repeat a function of the button at the first user interface element that is a last button still pressed, the first repeat interval set comprising data corresponding to one or more repeat interval times from which the button repeat logic determines when to repeat the function of the button; and wherein the button repeat data associated with the first user interface element further includes at least one of button recurrence information related to how many times a repeat interval time of the first repeat interval set is to be reused or for how long a repeat interval time of the first repeat interval set is to be reused, interval skip information related to interval selection upon focus returning to the first user interface element, interval reset information related to resetting to a first repeat interval time of the first repeat interval set upon focus returning to the first user interface element, information that indicates that the last button still pressed is not to repeat when focus returns to the first user interface element until the last button still pressed is no longer pressed or is no longer the last button still pressed, or an action to take instead of repeating the function of the button.

10. The system of claim 9 wherein the global input system maintains a global counter incremented for each button that changes the last button still pressed, or a global timer that represents how long the button is the last button still pressed, or both a global counter and a global timer.

11. The system of claim 10 wherein the focus changes to one or more different user interface elements and returns back to the first user interface element with a button identifier that indicates that the last button still pressed has not changed to a new button identifier when focus returned to the first user interface element, wherein the global input system returns a global counter value corresponding to the global counter to the first user interface element as part of the button event data, and the view logic configured to use the global counter value and a view-cached counter value to determine whether the last button still pressed remained pressed while focus was changed to the one or more different user interface elements.

12. The system of claim 11 wherein the first repeat interval set comprises a plurality of repeat interval times, and wherein the first user interface element resets to a first repeat interval time of the first repeat interval set when the global counter indicates that the last button still pressed did not remain pressed while focus was changed to the one or more different user interface elements.

13. The system of claim 11 wherein the first repeat interval set comprises a plurality of repeat interval times, and wherein the view logic selects a repeat interval time of the first repeat interval set that is other than a first repeat interval time of the first repeat interval set when the global counter indicates that the last button still pressed remained pressed while focus was changed to the one or more different user interface elements.

14. The system of claim 13 wherein the button event data includes global timer data, and wherein the view logic selects the repeat interval time that is other than the first repeat interval time based at least in part upon the global timer data.

15. The system of claim 9 wherein the focus changes to one or more different user interface elements and returns back to the first user interface element with a button identifier that indicates that the last button still pressed has not changed to a new button identifier when focus returned to the first user interface element, and wherein the view logic is configured to register for button change events to determine whether the last button still pressed remained pressed while focus was changed to the one or more different user interface elements, or wherein the view logic is configured to receive button change events from a higher level parent user interface element in a view tree in which the first user interface element is represented to determine whether the last button still pressed remained pressed while focus was changed to the one or more different user interface elements.

16. The system of claim 9 wherein the button repeat data is associated with the first user interface element via first style property data associated with the first user interface element, wherein the button repeat data is associated with the second user interface element via second style property data associated with the second user interface element, and further comprising, a view factory that returns a styled user interface element instance of the first user interface element based upon the first style property data and that returns a styled user interface element instance of the second user interface element based upon the second style property data.

17. One or more machine-readable storage media having machine-executable instructions stored thereon, in response to execution, cause a system including a processor to perform operations, comprising:

(a) assigning a first user interface element to a first repeat interval set associated with a button, the first repeat interval set comprising at least two intervals associated with the button and the first user interface element;

(b) assigning a second user interface element to a second repeat interval set associated with the button, wherein the second repeat interval set is different from the first repeat interval set;

(c) receiving button event data at the first user interface element that identifies a button as a last button still pressed, and outputting an initial button event at the first user interface element;

(d) selecting a starting interval time from the first repeat interval set associated with the first user interface element and associated with the button as a selected interval time;

(e) using the selected interval time to repeat a function of the button at the first user interface element;

(f) determining if a next interval time exists in the first repeat interval set, and if so, selecting the next interval time as the selected interval time; and (g) using further button event data to determine whether the button is the last button still pressed, and if so, returning to step (e) until the button event data indicates that the button is no longer the last button still pressed.

18. The one or more machine-readable storage media of claim 17 wherein selecting the starting interval time from the first repeat interval set comprises choosing the starting interval time from the first repeat interval set based at least in part upon a total time the last button still pressed has remained pressed, including time pressed in the second user interface element.

19. A method performed at least in part on at least one machine, comprising:

assigning a first user interface element of an application to a first repeat interval set associated with a button, the first repeat interval set comprising at least two intervals associated with the button and the first user interface element;

assigning a second user interface element of the application to a second repeat interval set associated with the button, wherein the second repeat interval set is different from the first repeat interval set;

obtaining button event data at the first user interface element, in which the button event data corresponds to a button that is a last button still pressed;

using button repeat data comprising the first repeat interval set to determine a first repeat interval for the button and a second repeat interval for the button;

repeating a function of the button at the user interface element based upon the first repeat interval while the button is the last button still pressed;

repeating the function of the button at the user interface element based upon the second repeat interval while the button is the last button still pressed; and switching focus from the first user interface element to the second user interface element, switching focus back to the first user interface element including receiving other button event data, determining from the other button event data that the button event data still corresponds to the last button still pressed, and repeating the function of the button at the first user interface element without resetting to the first repeat interval for use in determining when to repeat the function of the button at the first user interface element.

20. A system comprising:
a processor; and
a memory communicatively coupled to the processor, the memory having stored therein computer-executable instructions, comprising:
a global input system;
a plurality of user interface elements of an application program, each user interface element coupled to receive input event data from the global input system when that user interface element is a focused user interface element having current focus, including button event data that identifies when a button is pressed, the plurality of user interface elements comprising a first user interface element assigned to a first repeat interval set for the button and a second user interface element assigned to a second repeat interval set for the button, wherein the second repeat interval set is different from the first repeat interval set;
the first user interface element, when focused, including or coupled to button repeat logic that handles button event data received from the global input system, including to select button repeat data that is associated with the first user interface element for the button, the button repeat data comprising the first repeat interval set used by the button repeat logic to determine when to repeat a function of the button at the first user interface element that is a last button still pressed, the first repeat interval set comprising data corresponding to one or more repeat interval times from which the button repeat logic determines when to repeat the function of the button; and
wherein the focus changes to one or more different user interface elements and returns back to the first user interface element with a button identifier that indicates that the last button still pressed has not changed to a new button identifier when focus returned to the first user interface element, and wherein the view logic is configured to register for button change events to determine whether the last button still pressed remained pressed while focus was changed to the one or more different user interface elements, or wherein the view logic is configured to receive button change events from a higher level parent user interface element in a view tree in which the first user interface element is represented to determine whether the last button still pressed remained pressed while focus was changed to the one or more different user interface elements.

* * * * *